United States Patent
Karjalainen et al.

(10) Patent No.: US 11,800,390 B2
(45) Date of Patent: Oct. 24, 2023

(54) CROSS-LINK INTERFERENCE MEASUREMENTS FOR NR

(71) Applicant: Nokia Technologies Oy, Espoo (FI)

(72) Inventors: Juha Karjalainen, Oulu (FI); Esa Tiirola, Kempele (FI); Ilkka Keskitalo, Oulu (FI); Juha Korhonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/053,046

(22) PCT Filed: Apr. 17, 2019

(86) PCT No.: PCT/FI2019/050312
§ 371 (c)(1),
(2) Date: Nov. 4, 2020

(87) PCT Pub. No.: WO2019/220005
PCT Pub. Date: Nov. 21, 2019

(65) Prior Publication Data
US 2021/0250797 A1    Aug. 12, 2021

Related U.S. Application Data

(60) Provisional application No. 62/673,565, filed on May 18, 2018.

(51) Int. Cl.
*H04W 24/10* (2009.01)
*H04B 17/336* (2015.01)
(Continued)

(52) U.S. Cl.
CPC .......... *H04W 24/10* (2013.01); *H04B 7/0626* (2013.01); *H04B 17/336* (2015.01); *H04L 5/0048* (2013.01); *H04W 76/11* (2018.02)

(58) Field of Classification Search
CPC ... H04L 1/0026; H04L 5/0091; H04L 1/0027; H04L 1/0057; H04L 5/0057;
(Continued)

(56) References Cited

U.S. PATENT DOCUMENTS

2015/0016564 A1* 1/2015 Yamamoto ........... H04B 7/0602
375/295
2017/0311320 A1* 10/2017 Lunttila ................ H04W 48/00
(Continued)

OTHER PUBLICATIONS

"Dynamic TDD Interference Mitigation Concepts in NR", 3GPP TSG RAN WG1#88, Athens, Greece, Feb. 13-17, 2017 (R1-1703110) (Year: 2017).*

(Continued)

*Primary Examiner* — Ian N Moore
*Assistant Examiner* — Sun Jong Kim
(74) *Attorney, Agent, or Firm* — SQUIRE PATTON BOGGS (US) LLP (57) ABSTRACT

A method includes receiving, by a user equipment, a configuration for determining one or more antenna panel-wise cross-link interference measurements from a network entity configured to receive one or more downlink spatial directions. The method also includes calculating, by the user equipment, one or more interference estimates of UL interfering signals and related cross-link interference powers from the network entity. The method further includes transmitting, by the used equipment, one or more interference measurements based upon the configured flexible UL-to-DL cross-link specific resource configuration to the network entity.

14 Claims, 8 Drawing Sheets

(51) Int. Cl.
*H04W 76/11* (2018.01)
*H04B 7/06* (2006.01)
*H04L 5/00* (2006.01)

(58) Field of Classification Search
CPC ..... H04L 5/0048; H04B 7/0626; H04B 7/063; H04B 7/0632; H04B 7/0645; H04B 17/345
See application file for complete search history.

(56) References Cited

U.S. PATENT DOCUMENTS

| | | | | |
|---|---|---|---|---|
| 2018/0091273 | A1* | 3/2018 | Choi | H04B 7/0478 |
| 2019/0274155 | A1* | 9/2019 | Bhattad | H04L 5/0048 |
| 2019/0349031 | A1* | 11/2019 | Xiang | H04B 7/046 |
| 2020/0213050 | A1* | 7/2020 | Chen | H04L 5/0051 |
| 2020/0389805 | A1* | 12/2020 | Kim | H04J 11/00 |
| 2021/0067307 | A1* | 3/2021 | Kim | H04L 5/14 |

OTHER PUBLICATIONS

U.S. Appl. No. 62/638,709, filed 2018.*
"New SID Proposal: Study on Integrated Access and Backhaul for NR", 8881123GPP TSG RAN Meeting #75, RP-170821, Agenda : 9.1, AT&T, Mar. 6-9, 2017, 5 pages.
"3rd Generation Partnership Project; Technical Specification Group Radio Access Network; Evolved Universal Terrestrial Radio Access (E-UTRA); Physical layer procedures(Release 15)", 3GPP TS 36.213, V15.1.0, Mar. 2018, 499 pages.
"3rd Generation Partnership Project; Technical Specification Group Radio Access Network; NR; Physical channels and modulation (Release 15)", 3GPP TS 38.211, V15.1.0, Mar. 2018, pp. 1-90.
"3rd Generation Partnership Project; Technical Specification Group Radio Access Network; NR; Physical layer procedures for data (Release 15)", 3GPP TS 38.214, V15.1.0, Mar. 2018, pp. 1-77.
"3rd Generation Partnership Project; Technical Specification Group Radio Access Network; NR; Multiplexing and channel coding (Release 15)", 3GPP TS 38.212, V15.1.1, Apr. 2018, pp. 1-94.
International Search Report and Written Opinion received for corresponding Patent Cooperation Treaty Application No. PCT/FI2019/050312, dated Jun. 27, 2019, 14 pages.
"Dynamic TDD Interference Mitigation Concepts in NR", 3GPP TSG RAN WG1#88, R1-1703110, Agenda : 8.1.6.2, Nokia, Feb. 13-17, 2017, 6 pages.
"SRS Design Considerations in NR", 3GPP TSG RAN WG1 Meeting #90, R1-1714259, 6.1.2.3.5, Nokia, Aug. 21-25, 2017, 6 pages.
"Discussion on Joint CLI Measurement and Beam Management", 3GPP TSG RAN WG1 Meeting 90bis, R1-1717623, Agenda : 7.2.2.6, Samsung, Oct. 9-13, 2017, 4 pages.
"On Cross-link Interference Management", 3GPP TSG RAN WG1 Meeting #95, R1-1812707, Agenda : 7.2.3.3, Nokia, Nov. 12-16, 2018, 6 pages.

* cited by examiner

OFDM symbol position

CROSS-LINK INTERFERENCE MEASUREMENTS FOR NR

RELATED APPLICATION

This application was originally filed as PCT Application No. PCT/FI2019/050312, filed on 17 Apr. 2019, which claims priority from U.S. Provisional Application No. 62/673,565, filed on 18 May 2018, each of which is incorporated herein by reference in its entirety.

BACKGROUND

Field

Certain embodiments may relate to wireless communication systems. For example, some embodiments may relate to cross-link interference measurements.

Description of the Related Art

To enable efficient dynamic time-division duplexing-based communication in new radio systems, uplink and downlink communication link directions need to be selected by taking into account traffic and interference conditions at both uplink and downlink sides of network nodes.

However, challenges arise in interference measurement techniques that involve measurement patterns which have not been designed to match with uplink sounding reference signal resource element (RE) patterns. For example, the number of REs per measured resource at the user equipment (UE)-side decreases, leading to inaccuracy in reported sounding reference signal (SRS)-based Reference Signal Received Power (RSRP), Received Signal Strength Indicator (RSSI), or Signal to Interference and Noise Ratio (SINR) values.

SUMMARY

In accordance with some embodiments, a method may include configuring, by a network entity, a flexible uplink-to-downlink (UL-to-DL) cross-link specific resource configuration for at least one antenna panel according to one or more interfering UL signal type characteristics. The method may further include receiving, by the network entity, one or more cross-link interference measurements based upon the configured flexible UL-to-DL cross-link specific resource configuration.

In accordance with some embodiments, a method may include receiving, by a user equipment, a configuration for determining one or more antenna panel-wise reference signal received power and/or received signal strength indicator based cross-link interference measurements from a network entity configured to receive one or more downlink spatial directions. The method may further include calculating, by the user equipment, one or more interference estimates of UL interfering signals and related cross-link interference powers from the network entity. The method may further include transmitting, by the user equipment, one or more interference measurements based upon the configured flexible UL-to-DL cross-link specific resource configuration to the network entity.

In accordance with some embodiments, an apparatus may include configuring means for configuring a flexible uplink-to-downlink (UL-to-DL) cross-link specific resource configuration for at least one antenna panel according to one or more interfering UL signal type characteristics. The apparatus may further include receiving means for receiving one or more cross-link interference measurements based upon the configured flexible UL-to-DL cross-link specific resource configuration.

In accordance with some embodiments, an apparatus may include receiving means for receiving a configuration for determining one or more antenna panel-wise reference signal received power and/or received signal strength indicator based cross-link interference measurements from a network entity configured to receive one or more downlink spatial directions. The apparatus may further include calculating means for calculating one or more interference estimates of UL interfering signals and related cross-link interference powers from the network entity. The apparatus may further include transmitting means for transmitting one or more interference measurements based upon the configured flexible UL-to-DL cross-link specific resource configuration to the network entity.

In accordance with some embodiments, an apparatus may include at least one processor and at least one memory including computer program code. The at least one memory and the computer program code may be configured to, with the at least one processor, cause the apparatus to at least configure a flexible uplink-to-downlink (UL-to-DL) cross-link specific resource configuration for at least one antenna panel according to one or more interfering UL signal type characteristics. The at least one memory and the computer program code may be further configured to, with the at least one processor, cause the apparatus to at least receive one or more cross-link interference measurements based upon the configured flexible UL-to-DL cross-link specific resource configuration.

In accordance with some embodiments, an apparatus may include at least one processor and at least one memory including computer program code. The at least one memory and the computer program code may be configured to, with the at least one processor, cause the apparatus to at least receive a configuration for determining one or more antenna panel-wise reference signal received power and/or received signal strength indicator based cross-link interference measurements from a network entity configured to receive one or more downlink spatial directions. The at least one memory and the computer program code may be further configured to, with the at least one processor, cause the apparatus to at least calculate one or more interference estimates of UL interfering signals and related cross-link interference powers from the network entity. The at least one memory and the computer program code may be further configured to, with the at least one processor, cause the apparatus to at least transmit one or more interference measurements based upon the configured flexible UL-to-DL cross-link specific resource configuration to the network entity.

In accordance with some embodiments, a non-transitory computer readable medium may be encoded with instructions that may, when executed in hardware, perform a method. The method may configure a flexible uplink-to-downlink (UL-to-DL) cross-link specific resource configuration for at least one antenna panel according to one or more interfering UL signal type characteristics. The method may further receive one or more cross-link interference measurements based upon the configured flexible UL-to-DL cross-link specific resource configuration.

In accordance with some embodiments, a non-transitory computer readable medium may be encoded with instructions that may, when executed in hardware, perform a method. The method may receive a configuration for determining one or more antenna panel-wise reference signal received power and/or received signal strength indicator based cross-link interference measurements from a network entity configured to receive one or more downlink spatial directions. The method may further calculate one or more interference estimates of UL interfering signals and related cross-link interference powers from the network entity. The method may further transmit one or more interference measurements based upon the configured flexible UL-to-DL cross-link specific resource configuration to the network entity.

In accordance with some embodiments, a computer program product may perform a method. The method may configure a flexible uplink-to-downlink (UL-to-DL) cross-link specific resource configuration for at least one antenna panel according to one or more interfering UL signal type characteristics. The method may further receive one or more cross-link interference measurements based upon the configured flexible UL-to-DL cross-link specific resource configuration.

In accordance with some embodiments, a computer program product may perform a method. The method may receive a configuration for determining one or more antenna panel-wise reference signal received power and/or received signal strength indicator based cross-link interference measurements from a network entity configured to receive one or more downlink spatial directions. The method may further calculate one or more interference estimates of UL interfering signals and related cross-link interference powers from the network entity. The method may further transmit one or more interference measurements based upon the configured flexible UL-to-DL cross-link specific resource configuration to the network entity.

In accordance with some embodiments, an apparatus may include circuitry configured to configure a flexible uplink-to-downlink (UL-to-DL) cross-link specific resource configuration for at least one antenna panel according to one or more interfering UL signal type characteristics. The circuitry may further receive one or more cross-link interference measurements based upon the configured flexible UL-to-DL cross-link specific resource configuration.

In accordance with some embodiments, an apparatus may include circuitry configured to receive a configuration for determining one or more antenna panel-wise reference signal received power and/or received signal strength indicator power based cross-link interference measurements from a network entity configured to receive one or more downlink spatial directions. The circuitry may further calculate one or more interference estimates of UL interfering signals and related cross-link interference powers from the network entity. The circuitry may further transmit one or more interference measurements based upon the configured flexible UL-to-DL cross-link specific resource configuration to the network entity.

BRIEF DESCRIPTION OF THE DRAWINGS

For proper understanding of this disclosure, reference should be made to the accompanying drawings, wherein.

DETAILED DESCRIPTION

The features, structures, or characteristics of certain embodiments described throughout this specification may be combined in any suitable manner in one or more embodiments. For example, the usage of the phrases "certain embodiments," "some embodiments," "other embodiments," or other similar language throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

Certain embodiments contained herein may provide significant technical advantages. For example, certain embodiments may allow a network to flexibly configure cross-link interference measurement windows defined in frequency and time for a UE. Based on the measurement window, the UE is able to measure accurately uplink-to-downlink (UL)-to-(DL) cross-link interference associated with any UL Rel-15 based reference signal resource in frequency and time domain. Furthermore, by using configurable cross-link interference measurement window, interference estimates can be computed even based on UL physical shared data channels (PUSCH). By using a DL demodulation reference signals (DMRS) based UL-to-DL cross-link measurement framework, scheduling restrictions from two neighbouring relay nodes can be reduced leading to enhanced backhaul capacity. Furthermore, there is no need to introduce additional scheduling restrictions for relay/donor node(s) scheduling UL SRS on access link to enable UL-to-DL cross-link measurement in another relay node. Due to use of DL DMRS, no specific resources associated with reference signals are needed to be configured for cross-link measurements leading to a reduced reference signal overhead.

In one embodiment, a UL-to-DL cross-link interference-specific channel state information interference measurement (CSI-IM) configuration may be defined for antenna panel-wise interference measurements performed at a UE. Using higher layer signaling for UE, a network may configure a flexible UL-to-DL cross-link specific resource configuration according to the characteristics of one or more interfering UL signal types, including reference signals like SRS, DMRS, phase tracking reference signal (PTRS), and/or other reference signals. One or more cross-link interference measurement resources may be defined to be flexibly configurable in frequency and/or time, according to one or more interfering UL signal types.

Higher-layer signaling configured interfering UL interfering signal types may contain several types of information, for example, UL SRS including a number of interfering UL SRS transmissions and information related to each interfering UL SRS. Configurations with UL SRS may include comb types of 2 and/or 4, cyclic shift values of 0-7 (comb type 2) and/or values of 0-11 (comb type 4), 1-4 antenna ports, a start position in time and/or frequency, SRS sequence identity, and/or number of physical resource blocks reserved for SRS transmission.

UL interfering signal types may also contain UL DMRS information, including a number of interfering UL DMRS transmissions and/or information related to each interfering UL DMRS. This may include DMRS type A or B, and/or a number of physical resource blocks reserved for DMRS transmission. In addition, UL DMRS information may contain reference signal sequence generation initialization parameters with or without transform precoding, such as OFDM symbol numbers within a slot, slot numbers within a frame, scramblingID0, scramblingID1, and/or initialization values of a pseudo-random sequence generator for DMRS. UL DMRS information may further contain sequence generation initialization parameters with transform precoding, similar to the sequence group.

UL signal types may also contain UL PTRS, including a number of interfering UL PTRS transmissions and/or information related to each interfering UL PTRS. For example, UL PTRS transmissions may include PRB start index values and one or more number of PRBs, as well as start positions of resource elements and resource element density according to frequency. Furthermore, UL PTRS transmissions may also contain initialization values associated with a pseudo-random sequence generator. In addition, UL PTRS transmissions may also include a start index of PRB, PRB density values such as for every $m^{th}$ PRB, and/or a number of PRBs.

One embodiment may include antenna panel-wise UL-to-DL cross-link interference measurements and a cross-link estimation method using DL CSI-IM resources. The network may use higher layer signaling of the UE to configure UL-to-DL cross-link interference measurement types, including full/partial/unknown, and other types that are associated with measurement resources for UE.

At higher carrier frequencies, for cross-link interference measurements, the network may configure CSI-IM resource to have different spatial Quasi-co-location (QCL) assumptions, including QCL-type D with respect to CSI-RS resource for channel measurements. In addition, spatially QCLed resources with CSI-IM to be configured may include DMRS for physical dedicated control channel (PDCCH), synchronization signal block (SSB) resource, and/or CSI-RS resources for frequency time-tracking, beam management, and mobility.

Another embodiment may include UL-to-DL cross-link measurement types that may be full, including all interfering signals such as cross-link measurements with full information about UL interfering signals. For example, the UE may calculate channel estimates for each known UL interfering signal and/or the related interference power by computing L1-RSRP using channel estimates.

In other embodiments, when the UL-to-DL cross-link measurement type is configured as a partial type, such as the only part of interfering UL RSs are known, the UE may calculate channel estimates of each known UL interfering signal and/or the related interference power by computing L1-RSRP with the aid of the channel estimates. The residual unknown interference power estimate may be computed by first using known channel estimates of UL interfering signals to regenerate known interference components and substracking them from received signals associated with interference measurement resources at the UE side. Then, after the subtraction of known UL interference components, residual measured interference signal power is calculated by computing received signal strength indicator (RSSI) from the residual received signal. In addition, unknown interference power measured at the UE may also be computed by computing L1-RSSI on residual interference signal. When the UL-to-DL cross-link measurement type is configured as unknown, the UE computes RSSI on configured cross-link interference measurement resources.

Another embodiment may include UL-to-DL cross-link interference measurement resources and/or an antenna panel-wise cross-link interference computation method based on DL DMRSs for a relay node. For example, for DMRS based cross-link interference measurements at a relay node, a network may configure, using higher layers of the UE, UL-to-DL cross-link interference measurement types to be full, partial, and/or unknown.

Based on assistance information from a donor node, interfering UL signal type configurations from neighboring relay nodes may be made available for relay nodes. In some embodiments, cross-link measurements with higher carrier frequencies, cross-link measurements may have the same spatial QCL assumptions, such as QCL-type D, with respect to DMRS for PDSCH associated with neighboring relay node links.

When UL-to-DL cross-link measurement type is configured as full, antenna panel-wise RSSI cross-link interference measurements based on DL DMRS resources may be computed by computing a residual cross-link interference signal by regenerating DL transmissions at a relay node by using channel estimates and known sequences associated with DMRS and subtracting them from the received signal.

In addition, relay nodes may calculate channel estimates of each known UL interfering signal may be based on residual cross-link interference signals. Furthermore, L1-RSRP of interfering known UL signals from residual cross-link interference signals may be computed with the aid of channel estimates related to known UL signals.

In some embodiments, the residual unknown interference power estimate computed by using the known UL interference components may be regenerated and subtracted from the received signal associated with interference measurement resources at the relay. After the subtraction of known UL interference components, residual measured interference signal power is calculated by computing received signal strength indicator (RSSI) from residual received signals. Unknown interference power measured at a relay node is computed by computing L1-RSSI on residual interference signals.

In an embodiment, antenna panel-wise UL-to-DL cross-link interference specific reporting according to configured cross-link measurement type may be defined for UEs and/or relay nodes. For example, when UL-to-DL cross-link measurement types are configured as full, such as where all interfering signals are known, the report may consist of K-largest in terms of L1-RSRPs associated with UL-to-DL cross-link interferences, and their resource indicators are reported per antenna panel.

When UL-to-DL cross-link measurement types are configured as partial, the report consists of K−1 largest in terms of L1-RSRPs associated with UL-to-DL cross-link interference measurements, and their resource indicators are reported per antenna panel. In some embodiments, one L1-RSSI value may be associated with UL-to-DL cross-link interference measurements, such as residual interference.

When UL-to-DL cross-link measurement types are configured as unknown, the report consists of one L1-RSSI value associated with UL-to-DL cross-link interference measurements. In all above embodiments, a network configures the parameter K by using higher layers of the UE.

Another embodiment may include a combination of hybrid CSI-IM and DMRS resource configuration, as well as its use for antenna panel-wise UL-to-DL cross-link interference measurements and reporting at the UE or relay node. For example, the network may be configured, by using higher layers of the UE or relay node, to use a hybrid of CSI-IM and DMRS resources in time and/or frequency for UL-to-DL cross-link interference measurements. In some embodiments, the network may configure CSI-IM resources to have different spatial QCL assumptions, such as QCL-type D, with respect to CSI-RS resource channel measurements. Other possible spatially QCL-related resources with CSI-IM may be configured for DMRS for PDCCH or SSB resources and/or CSI-RS resources for frequency time-tracking, beam management and mobility. In some embodiments, the network may configure flexibly CSI-IM resources in time and frequency according to interfering UL signal type.

Based on UL-to-DL measurement type, UL-to-DL cross-link interference may be estimated for both CSI-IM and DMRS resources. The UE may combine by averaging cross-link interference measurements L1-RSRP and L1-RSSI according to UL-to-DL measurement types for each type separately. Cross-link interference reporting follows the above described antenna-panel-wise UL-to-DL cross-link interference reporting method. Group triggering may cause at least one UE group in at least one interfering cell to transmit the predetermined signals at predefined time instant(s), such as slot T. Triggering may be based on reception of PDCCH with group-specific RNTI. Some embodiments may include techniques to facilitate cross-link measurements. For example, UE grouping may allow one or more UEs to be configured to transmit one or more predefined signals, such as SRS, using one or more predefined resources. One or more signals may be confined within a slot so that it can be measured using cross-link specific CSI-IM. Furthermore, each group may have a group-specific RNTI. The UE may also perform measurements on a cell A (D1) by performing cross-link interference measurement from at least one UE group, for example, signal to measure coming from at least one interfering cell (B), wherein the measurement is carried out at the predefined time instant(s), such as slot T.

Figure 1:
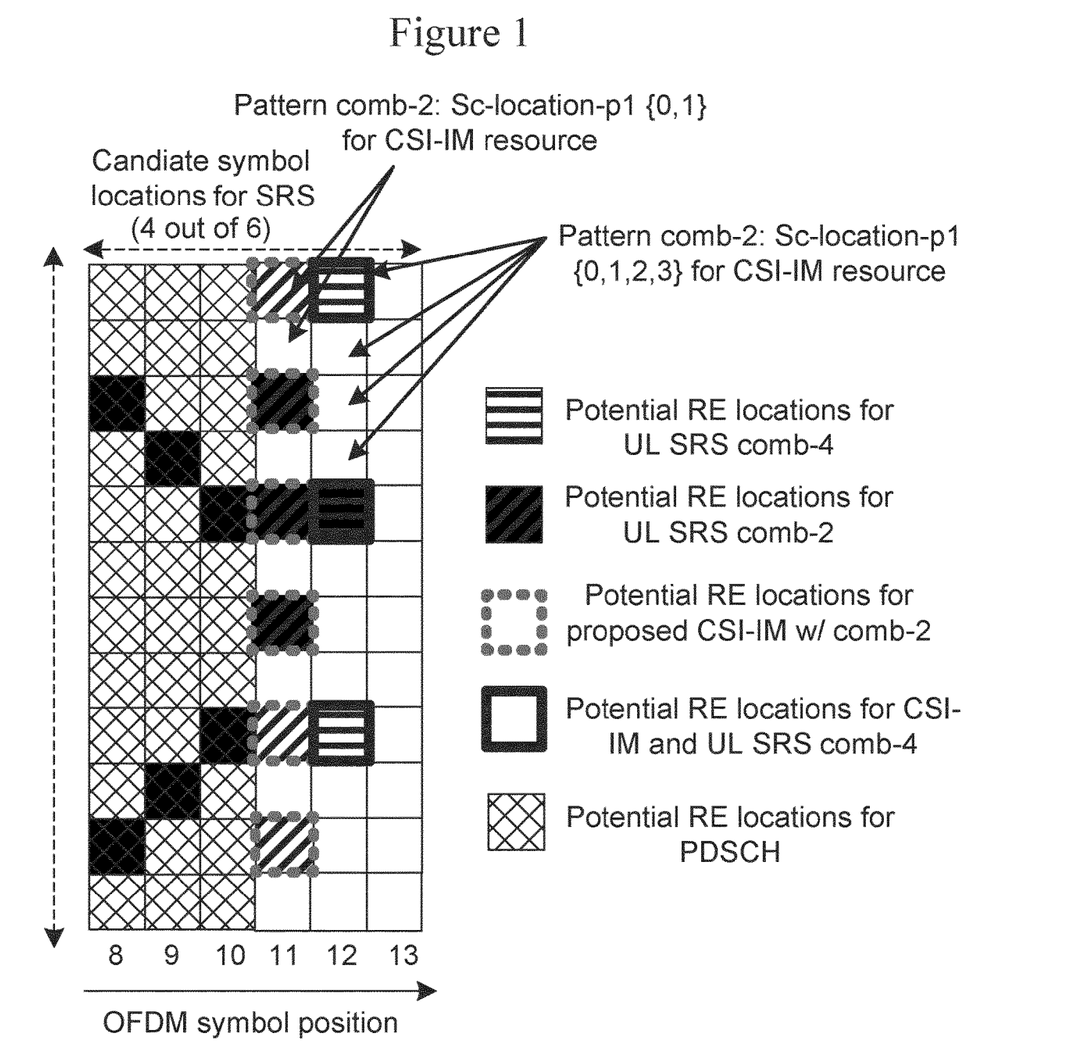
FIG. 1 illustrates an example of UL-to-DL cross-link specific interference measurements according to certain embodiments.

FIG. 1 illustrates an example of proposed UL-to-DL cross-link specific interference measurement resource configuration for below 6 GHz communications. In order to enable the measurement of UL-to-DL cross-link interference, neighbouring gNB and/or relay node has scheduled access link UE to transmit UL SRS signals in two consecutive two OFDM symbols with comb-2 and comb-4 RE patterns. In some embodiments, another gNB may have awareness of a neighbouring gNB's access link UL SRS resource configuration, such as symbol location, SRS bandwidth, and comb-type. Based on this information, the network may configure by RRC signalling for an intended UE single CSI-IM resource set with two CSI-IM resources inside of CSI-IM set to have same bandwidth configuration and RE pattern as interfering UE UL SRS transmission. The resources within the CSI-IM resource set have been configured to be as aperiodic.

In addition, a network may be configured as a single CS-IM resource set with two CSI-IM resources for UL-to-DL cross-link interference. The first cross-link interference measurement resource may be configured by starting a location index j=0 in frequency within PRB, where every $2^{nd}$ resource element is in frequency from the starting location in PRB. In addition, an $11^{th}$ OFDM symbol may be a location in time in a slot, and the UE signal type may be none.

In addition, second cross-link interference measurement resources may be configured by starting location index j=0 in frequency within PRB, and every $4^{th}$ resource element in frequency from the starting location in PRB. In addition, a $12^{th}$ OFDM symbol location in time in a slot, and UL signal type may be set as none.

Based on the above cross-link interference measurement resource configuration, UE can measure cross-link interference on configured PRBs with RE pattern matching comb-2 and comb-4 RE patterns. Since there is no information about UL RS type, UE is not aware of sequence level information related to SRS leading reported interference values to be based on RSSI.

Figure 2:
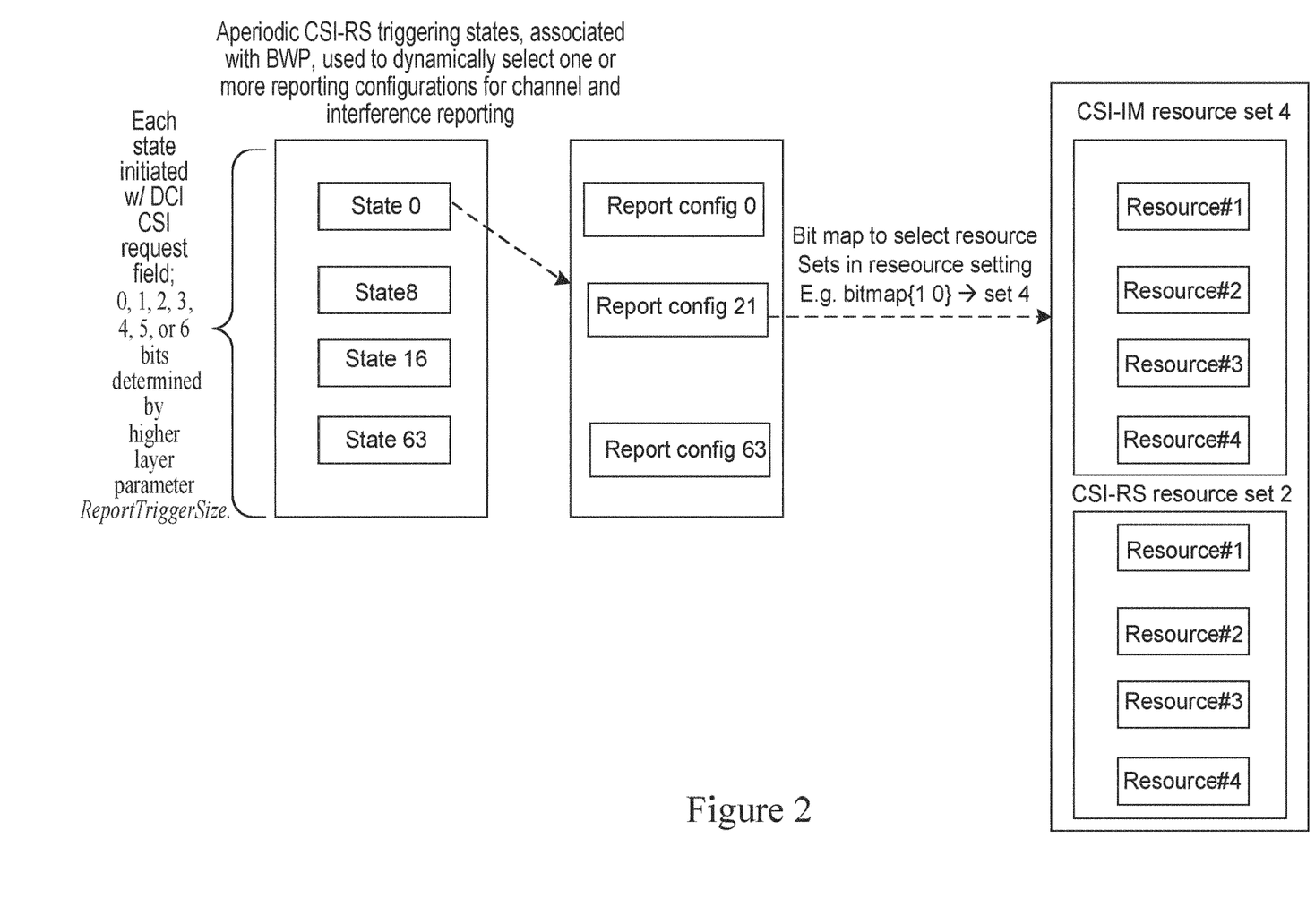
FIG. 2 illustrates an example of aperiodic CSI report triggering states according to certain embodiments.

FIG. 2 illustrates Rel-15 based aperiodic CSI report triggering by using downlink grant, such as DCI 1_1 format. In some embodiments, a network configures by RRC signalling aperiodic CSI triggering states and their association to transmission configuration indicator (TCI) states which elements provides quasi-colocation QCL source, such as UL or DL reference signal resource indicator/index as well as QCL-type for cross-link CSI-IM resources. In some embodiments, carrier frequency is below 6 GHz. Therefore, QCL-type D (defining UE RX beam former/beam group/antenna panel spatial reference) is not required to be configured. Aperiodic UL-to-DL cross-link interference measurement configuration is triggered via DL grant with DCI format 1_1 and CSI request field (6-bit). The CSI request field indicates reporting configuration(s) (0-63) and each configuration includes a bitmap which refers to CSI-IM resource sets associated with UL-to-DL cross-link interference measurement resources.

Figure 3:
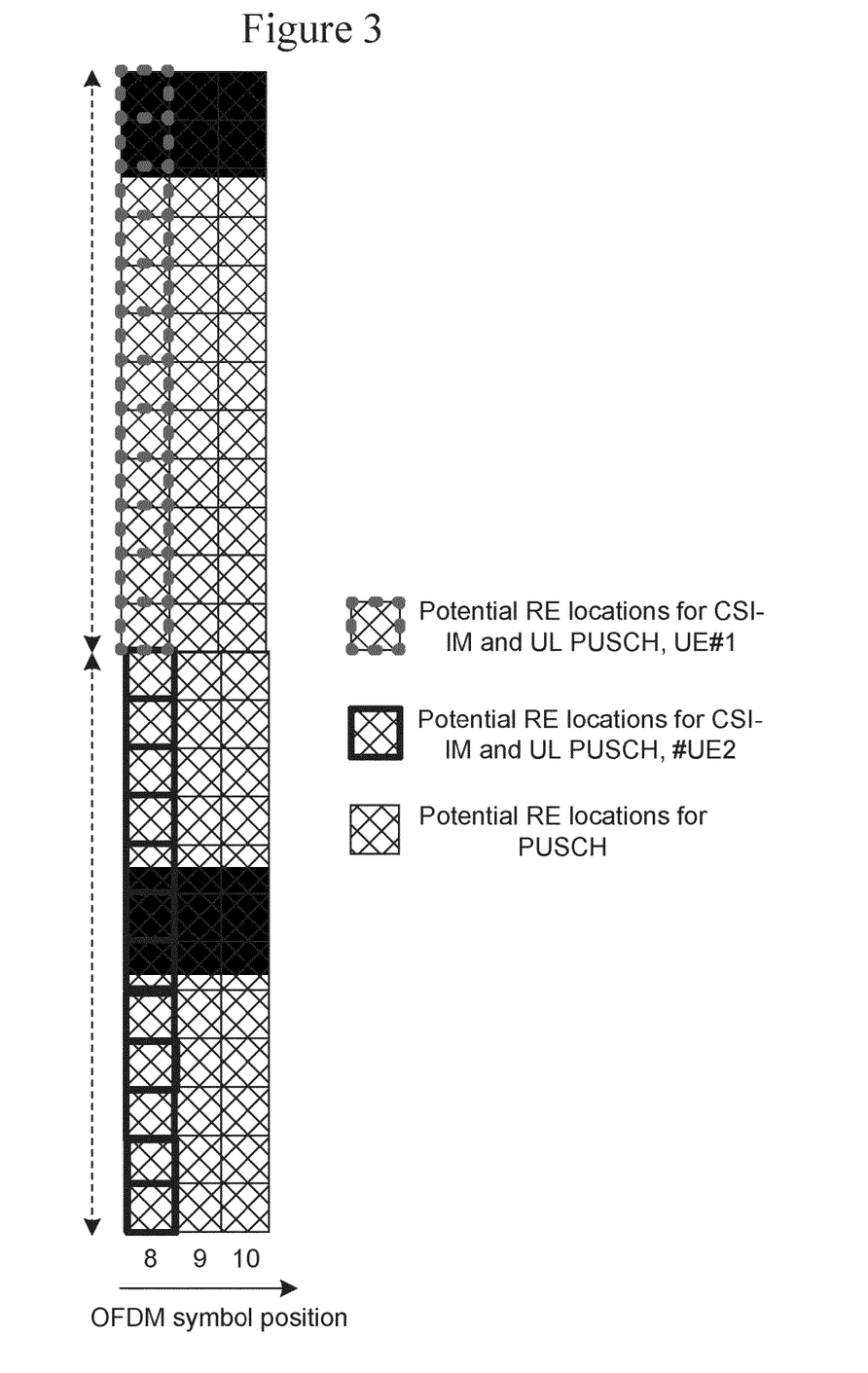
FIG. 3 illustrates an example of CSI-IM configuration for UL-to-DL cross-link measurements with two different UL PUSCH transmissions according to certain embodiments.

FIG. 3 illustrates an example of CSI-IM configuration for UL-to-DL cross-link measurements with two different UL PUSCH transmission from two different UEs. The network may inform the UE by RRC signalling about the bandwidth allocation of cross-link interference measurement resource window in terms of number of PRBs and the start location of PRBs. A network may have configured for UE a single CSI-IM resource set with two UL-to-DL crosslink interference measurement resources. In this example, two PRBs in one OFDM symbol are only shown. The first cross-link interference measurement resource has been configured by starting location index j=0 in frequency within PRB, where every resource element is measured in frequency from the starting location in PRB. The measurement may include an $8^{th}$-OFDM symbol location in time in a slot, and the UL signal type may be none. Based on the CSI-IM resource configuration, UE may compute separate RSSI values within cross-link interference measurement window assigned for PUSCH of UE 1 and PUSCH of UE 2. Thus, no specific resources associated with reference signals are needed to be configured for cross-link interference measurement leading to reduced reference signal overhead.

Figure 4:
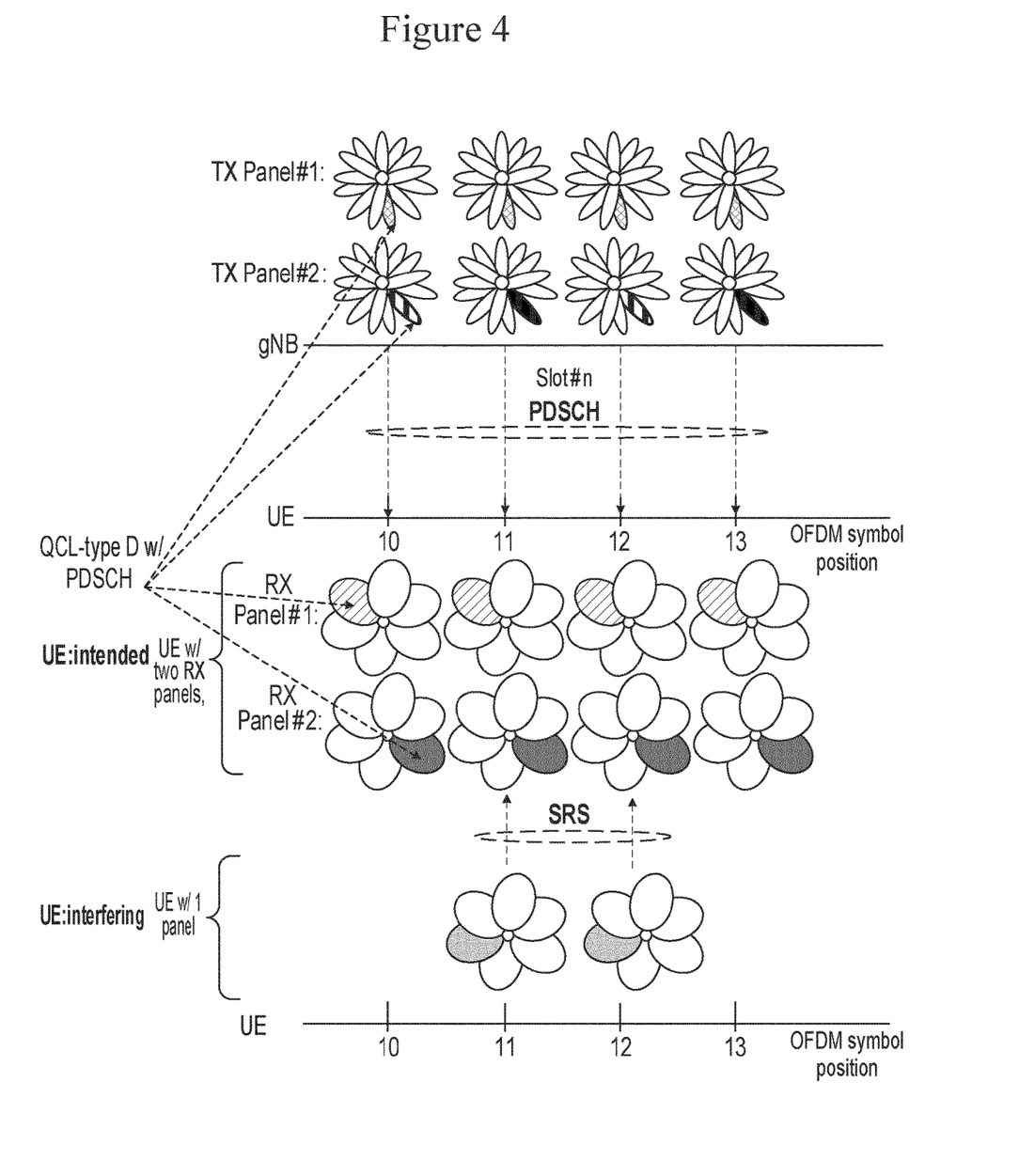
FIG. 4 illustrates an example of UL-to-DL cross-link measurement configurations at a user equipment according to certain embodiments.

FIG. 4 illustrates an example of proposed UL-to-DL cross-link specific measurement configuration at UE-side for above 6 GHz communications.

Figure 5:
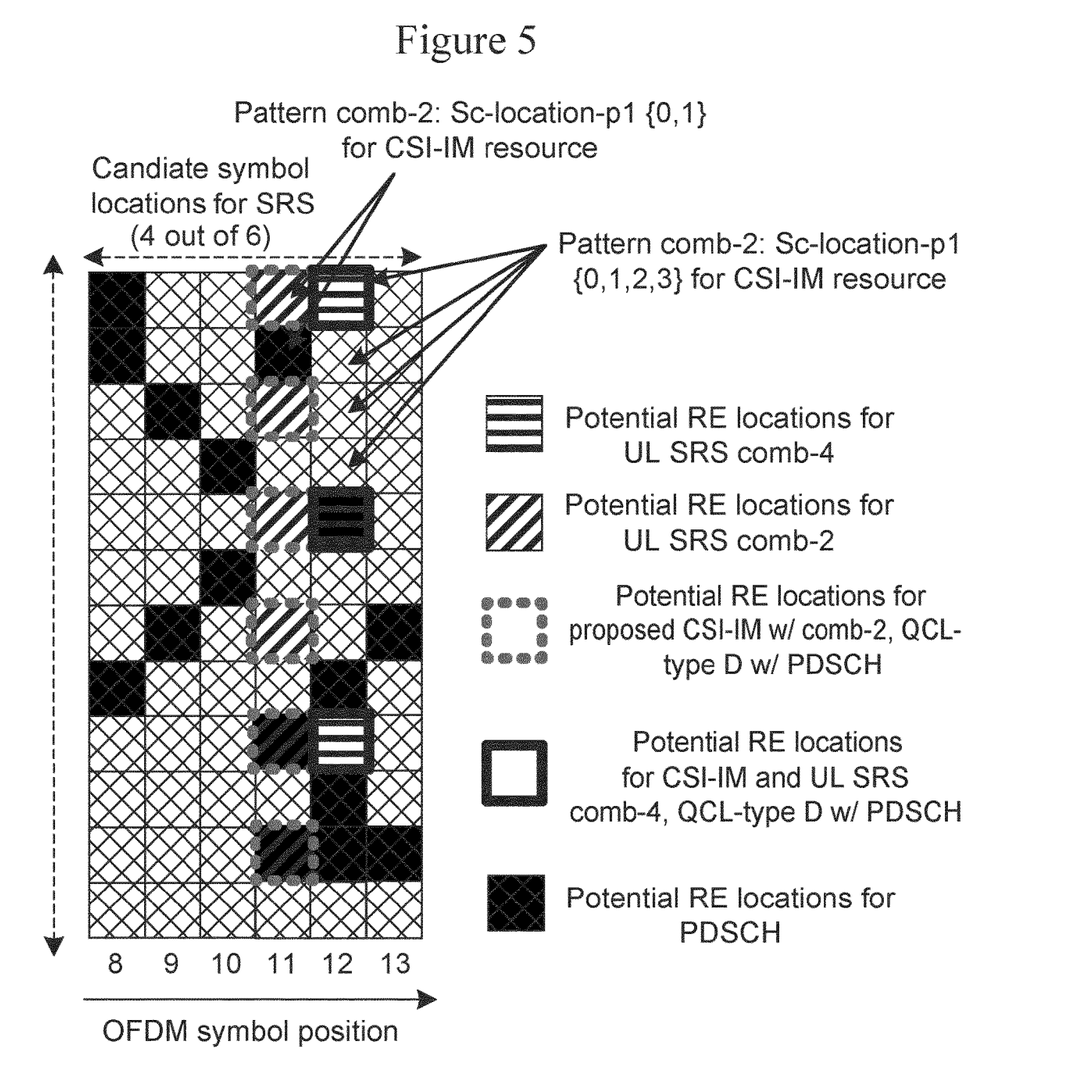
FIG. 5 illustrates an example of CSI-IM configuration for UL-to-DL cross-link measurements for above 6 GHz at the user equipment according to certain embodiments.

FIG. 5 illustrates an example of CSI-IM based UL-to-DL cross-link measurement configuration for above 6 GHz.

Figure 6:
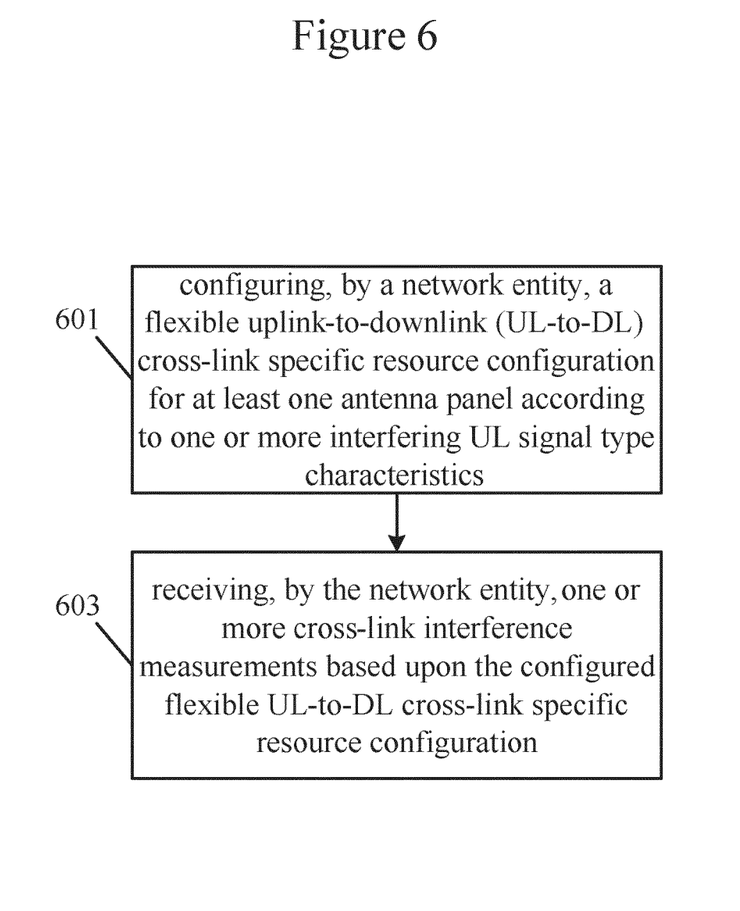
FIG. 6 illustrates an example of a method performed by a network entity according to certain embodiments.
Figure 8:
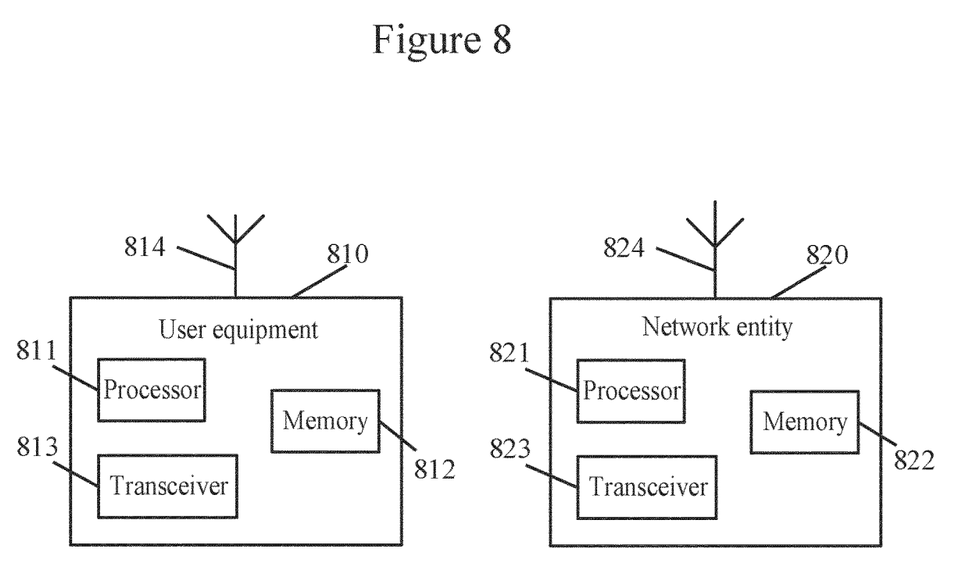
FIG. 8 illustrates an example of a system according to certain embodiments

FIG. 6 illustrates an example of a method performed by a network entity, such as network entity 820 in FIG. 8. In step 601, the network entity may configure a flexible uplink-to-downlink (UL-to-DL) cross-link specific resource configuration for at least one antenna panel according to one or more interfering UL signal type characteristics. In step 603, the network entity may receive one or more cross-link interference measurements based upon the configured flexible UL-to-DL cross-link specific resource configuration.

Figure 7:
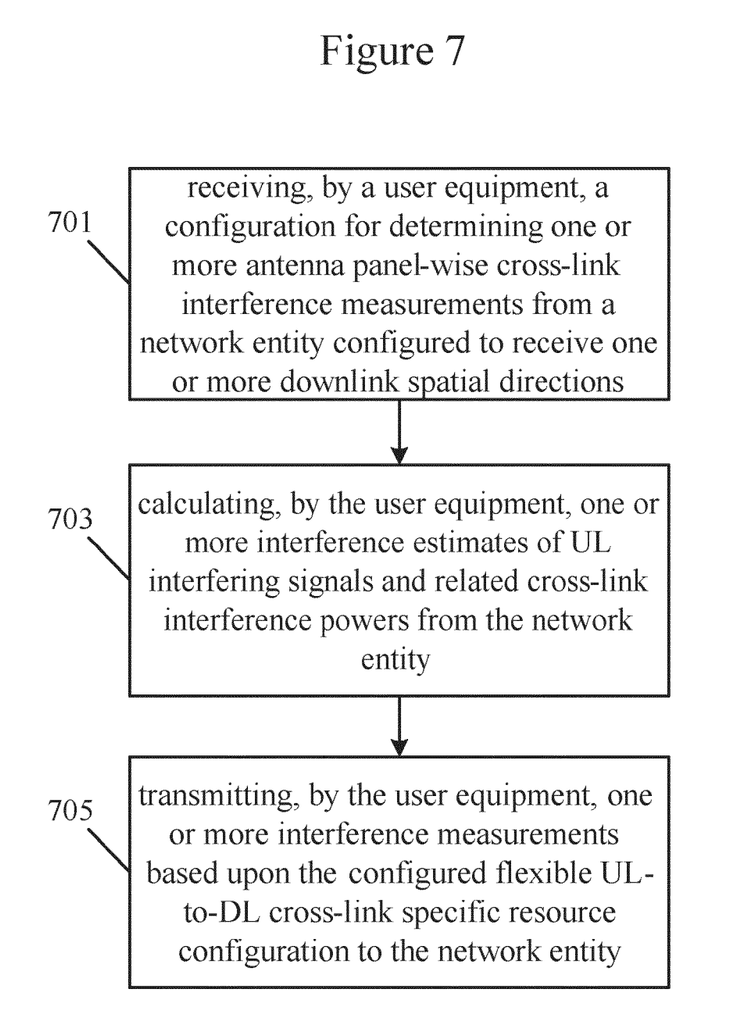
FIG. 7 illustrates an example of a method performed by a user equipment according to certain embodiments.

FIG. 7 illustrates another example of a method performed by a user equipment, such as user equipment 810 in FIG. 8. In step 701, the user equipment may receive a configuration for determining one or more antenna panel-wise cross-link interference measurements from a network entity configured to receive one or more downlink spatial directions. In step 703, the user equipment may calculate one or more interference estimates of UL interfering signals and related cross-link interference powers from the network entity. In some embodiments, the calculating may further include calculating one or more of full measurement types, partial measurement types, and/or unknown measurement types. In step 705, the user equipment may transmit one or more interference measurements based upon the configured flexible UL-to-DL cross-link specific resource configuration to the network entity.

FIG. 8 illustrates an example of a system according to certain embodiments. In one embodiment, a system may include multiple devices, such as, for example, user equipment 810 and network entity 820. It should be also understood that the term "user equipment (UE)" refers generally to a node or device implementing downlink reception and uplink transmission. Therefore, the applicability of the invention is not limited to the end user equipment but it is as well applicable to, for example, a mobile termination (MT) part of an Integrated Access and Backhaul (IAB) node implementing the same principles and operation as described for the user equipment.

User equipment 810 and network entity 820 may be one or more of a base station, such as an evolved node B (eNB) or next generation node B (gNB), a next generation radio access network (NG RAN), a serving gateway, a server, and/or any other access node or combination thereof. In some embodiments, user equipment 810 and/or network entity 820 may be a part of a relay node. Multiple relays may be chained together to form a multi-hop-relay network in a relay deployment. Furthermore, a citizens broadband radio service (CBRS) device (CBSD) may include one or more serving cells, such as user equipment 810 and network entity 820. UE 810 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 711 and 821. At least one memory may be provided in one or more of devices indicated at 812 and 822. The memory may be fixed or removable. The memory may include computer program instructions or computer code contained therein. Processors 811 and 821 and memory 812 and 822 or a subset thereof, may be configured to provide means corresponding to the various blocks of FIGS. 1-7. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple radio access technologies. Other configurations of these devices, for example, may be provided.

Transceivers 813 and 823 may be a transmitter, a receiver, or both a transmitter and a receiver, or a unit or device that may be configured both for transmission and reception.

Processors 811 and 821 may be embodied by any computational or data processing device, such as a central processing unit (CPU), application specific integrated circuit (ASIC), or comparable device. The processors may be implemented as a single controller, or a plurality of controllers or processors.

Memory 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-7). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-7. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

One having ordinary skill in the art will readily understand that certain embodiments discussed above may be practiced with steps in a different order, and/or with hardware elements in configurations, which are different from those that are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
BLER Block Error Rate
CBRA Contention-Based Random Access
CBRACH Contention-Based Random Access Channel
CE Control Element
CFRA Contention Free Random Access
CSI-RS Channel State Information Reference Signal
DCI Downlink Control Information
DMRS Demodulation Reference Signal
FR Frequency Range
gNB 5G Node B
IAB Integrated Access and Backhaul
MAC Medium Access Control
MT Mobile Termination
NR New Radio
PBCH Physical Broadcast Channel
PDCCH Physical Downlink Control Channel
PDSCH Physical Downlink Shared Channel
PRACH Physical Random Access Channel
QCL Quasi Co-Location
QoS Quality of Service
RNTI Radio Network Temporary Identifier
RRC Radio Resource Control
Rx Reception
SINR Signal-to-Interference-Plus-Noise Ratio
SS Synchronization Signal
SSB Synchronization Signal Block
TCI Transmission Configuration Indication
Tx Transmission
UE User Equipment

The invention claimed is:

1. A method comprising:
receiving, by a user equipment from a network entity, a configuration for determining at least one of:
one or more antenna panel-wise reference signal received powers; or
received signal strength indicator based cross-link interference measurement values,
wherein the configuration comprises a flexible uplink-to-downlink cross-link specific resource for characteristics of a plurality of different interfering uplink signal types;
calculating, by the user equipment, channel estimates of one or more uplink interfering signals and related cross-link interference powers, from the network entity, of the one or more uplink interfering signals; and
transmitting, by the user equipment to the network entity, one or more predefined signals based upon the flexible uplink-to-downlink cross-link specific resource configuration,
wherein the configuration comprises at least one hybrid resource for channel state information interference measurement and demodulation reference signals.

2. The method of claim 1, wherein the configuration for determining the one or more antenna panel-wise reference signal received powers is associated with at least one user equipment antenna panel or relay node.

3. The method of claim 1, wherein the calculating comprises calculating at least one of full measurement types, partial measurement types, or unknown measurement types.

4. The method of claim 1, wherein the cross-link interference measurement values comprise group triggering.

5. The method of claim 4, wherein the group triggering causes a group of user equipments in an interfering cell to be configured to transmit at least one predefined signal of the one or more predefined signals using at least one predefined resource, wherein the at least one predefined signal is confined to a slot.

6. The method of claim 4, wherein the group triggering is based on reception of physical downlink control channel with a group-specific radio network temporary identifier.

7. An apparatus comprising:
at least one processor; and
at least one memory storing instructions that, when executed by the at least one processor, causes the apparatus at least to:
receive, from a network entity, a configuration for determining at least one of:
one or more antenna panel-wise reference signal received powers; or
received signal strength indicator based cross-link interference measurement values,
wherein the configuration comprises a flexible uplink-to-downlink cross-link specific resource for characteristics of a plurality of different interfering uplink signal types;
calculate channel estimates of one or more uplink interfering signals and related cross-link interference powers, from the network entity, of the one or more uplink interfering signals; and
transmit, to the network entity, one or more predefined signals based upon the flexible uplink-to-downlink cross-link specific resource configuration,
wherein the configuration comprises at least one hybrid resource for channel state information interference measurement and demodulation reference signals.

8. The apparatus of claim 7, wherein the configuration for determining the one or more antenna panel-wise reference signal received powers is associated with at least one user equipment antenna panel or relay node.

9. The apparatus of claim 7, wherein the calculating comprises calculating at least one of full measurement types, partial measurement types, or unknown measurement types.

10. The apparatus of claim 7, wherein a user equipment group in an interfering cell allows one or more user equipments in the user equipment group to be configured to transmit at least one predefined signal of the one or more predefined signals using at least one predefined resource, wherein the at least one predefined signal is confined to a slot.

11. The apparatus of claim 7, wherein the cross-link interference measurement values comprise group triggering.

12. The apparatus of claim 11, wherein the group triggering is based on reception of physical downlink control channel with a group-specific radio network temporary identifier.

13. An apparatus comprising:
at least one processor; and
at least one memory storing instructions that, when executed by the at least one processor, causes the apparatus at least to:
transmit, to a user equipment, a configuration for the user equipment to determine at least one of:
one or more antenna panel-wise reference signal received powers; or
received signal strength indicator based cross-link interference measurement values; and receive one or more spatial directions, wherein configure the configuration comprises a flexible uplink-to-downlink cross-link specific resource for characteristics of a plurality of different interfering uplink signal types; and receive, from the user equipment, one or more cross-link predefined signals based upon the flexible uplink-to-downlink cross-link specific resource configuration, wherein the flexible uplink-to-downlink cross-link specific resource configuration comprises at least one hybrid resource for channel state information interference measurement and demodulation reference signals.

14. The apparatus of claim 13, wherein the characteristics of the plurality of different interfering uplink signal types comprises an uplink sounding reference signal, an uplink demodulation reference signal, and an uplink phase tracking reference signal.

* * * * *